(12) United States Patent
Abzarian et al.

(10) Patent No.: US 8,099,774 B2
(45) Date of Patent: Jan. 17, 2012

(54) DYNAMIC UPDATING OF FIREWALL PARAMETERS

(75) Inventors: David Abzarian, Kirkland, WA (US); Gerardo Diaz Cuellar, Snoqualmie, WA (US); Eran Yariv, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1030 days.

(21) Appl. No.: 11/589,513

(22) Filed: Oct. 30, 2006

(65) Prior Publication Data

US 2008/0148380 A1 Jun. 19, 2008

(51) Int. Cl.
*G06F 9/00* (2006.01)
*H04L 29/06* (2006.01)

(52) U.S. Cl. .......................................... 726/11; 713/151
(58) Field of Classification Search .................... 726/11; 713/151
See application file for complete search history.

(56) References Cited

U.S. PATENT DOCUMENTS

| | | | |
|---|---|---|---|
| 6,003,133 A * | 12/1999 | Moughanni et al. | 726/4 |
| 6,098,172 A | 8/2000 | Coss et al. | |
| 6,154,775 A | 11/2000 | Coss et al. | |
| 6,917,980 B1 * | 7/2005 | Gusler et al. | 709/229 |
| 7,774,836 B1 * | 8/2010 | Xie et al. | 726/13 |
| 2001/0039579 A1 * | 11/2001 | Trcka et al. | 709/224 |
| 2004/0100972 A1 * | 5/2004 | Lumb et al. | 370/401 |
| 2004/0111519 A1 | 6/2004 | Fu et al. | |
| 2005/0005165 A1 | 1/2005 | Morgan et al. | |
| 2005/0055708 A1 * | 3/2005 | Gould et al. | 725/25 |
| 2005/0075842 A1 * | 4/2005 | Ormazabal et al. | 702/188 |
| 2005/0076234 A1 * | 4/2005 | Krtolica et al. | 713/201 |
| 2005/0086298 A1 * | 4/2005 | Campbell et al. | 709/203 |
| 2005/0160289 A1 * | 7/2005 | Shay | 713/201 |
| 2005/0210291 A1 * | 9/2005 | Miyawaki et al. | 713/201 |
| 2005/0257244 A1 * | 11/2005 | Joly et al. | 726/1 |
| 2005/0268335 A1 | 12/2005 | Le et al. | |
| 2006/0048218 A1 | 3/2006 | Lingafelt et al. | |
| 2006/0059551 A1 | 3/2006 | Borella | |
| 2006/0085503 A1 * | 4/2006 | Stoye et al. | 709/206 |
| 2007/0016945 A1 * | 1/2007 | Bassett et al. | 726/11 |
| 2007/0022479 A1 * | 1/2007 | Sikdar et al. | 726/22 |
| 2007/0056029 A1 * | 3/2007 | Kay | 726/11 |
| 2007/0058540 A1 * | 3/2007 | Kay | 370/230 |

(Continued)

FOREIGN PATENT DOCUMENTS

EP 0909074 4/1999

OTHER PUBLICATIONS

Guha, et al., "Architecting a secure Internet", Date: 2005, pp. 1-12, ACM Press, NY, USA, http://delivery.acm.org/10.1145/1120000/1118614/a05-guha.pdf?key1=1118614&key2=7482136511&coll=ACM&dl=ACM&CFID=769104&CFTOKEN=39683652.

(Continued)

*Primary Examiner* — Techane Gergiso
(74) *Attorney, Agent, or Firm* — Alleman Hall McCoy Russell & Tuttle LLP

(57) ABSTRACT

The dynamic updating of firewall parameters is described. One exemplary embodiment includes receiving a policy rule that includes a reference to a predefined container that specifies a permissible value range of at least one firewall parameter allowable under the policy rule, receiving a firewall parameter value, and populating the predefined container with the firewall parameter value if the firewall parameter value is within the permissible value range, thereby updating the policy rule.

14 Claims, 7 Drawing Sheets

U.S. PATENT DOCUMENTS

2008/0172743 A1 * 7/2008 Aaron .............................. 726/25

OTHER PUBLICATIONS

Hwang, et al., "Micro-firewalls for dynamic network security with distributed intrusion detection", Date: 2001, http://ieeexplore.ieee.org/iel5/7617/20766/00962517.pdf?isNumber=.

Teo, et al., "Dynamic and risk-aware network access management", Date: 2003, pp. 217-230, ACM Press, NY, USA, http://delivery.acm.org/10.1145/780000/775441/p217-teo.pdf?key1=775441&key2=8970236511&coll=GUIDE&dl=GUIDE&CFID=781174&CFTOKEN=92259144.

* cited by examiner

DYNAMIC UPDATING OF FIREWALL PARAMETERS

BACKGROUND

A firewall may be generally defined as a hardware or software filter that prevents data packets from either entering or leaving a network unless specifically authorized. To control the flow of network traffic, data packets sent from or received at numbered ports in the firewall are either permitted or denied depending upon policy rules that are applied by the firewall. Such rules are generally set by an administrative entity such as a system administrator, and are used to implement a firewall policy. These rules specify when traffic may pass through the firewall based upon various firewall filtering parameters ("firewall parameters"), such as allowed port numbers, network addresses, and the like.

However, the "attack surface" of a firewall, or the exposure of the firewall to attack by malicious code, increases with the number of ports allowed to pass network traffic. Therefore, it may be beneficial to reduce a number of ports open at any time to reduce the attack surface of the firewall.

Ports may be opened either statically or dynamically. The static opening of ports is generally performed by an administrative entity prior to runtime, and may result in the port remaining open for all traffic until the port is closed manually. This may increase the number of openings in the firewall, and therefore may increase the attack surface of the firewall.

On the other hand, the dynamic opening of ports may be performed at runtime by an application or service. Thus, an inbound port is not opened until requested by the application or service. However, such an application or service may utilize administrative-level firewall policy rights to allow it to create policy exceptions to open ports for traffic. For example, an application or service with dynamic port definition capabilities may create firewall exceptions for every port on which it will pass incoming or outgoing traffic, or may create a blanket exception allowing the application or service to pass traffic through any transmission control protocol (TCP) or user datagram protocol (UDP) port. Therefore, large numbers of firewall exceptions may be created by various applications and services, with little visibility to an administrative entity. As a result, many more firewall ports may be open at any given time than allowed under the entity's firewall policy.

SUMMARY

Accordingly, the dynamic updating of firewall parameters in various manners that may offer an administrative entity a high degree of control and visibility of the firewall attack surface is described below in the Detailed Description. For example, in one embodiment, a dynamically updateable security policy at a firewall may be implemented by utilizing a policy rule that includes a reference to a predefined container. The predefined container specifies a permissible value range of at least one firewall parameter that is allowed to populate the container. The permissible value range may contain one or more permissible values. A program may then populate the predefined container with a permissible firewall parameter value, thereby dynamically updating the policy rule. The value with which the container is populated may then be enforced with the policy rule. This may permit an application or service to dynamically update a policy rule without altering firewall policy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
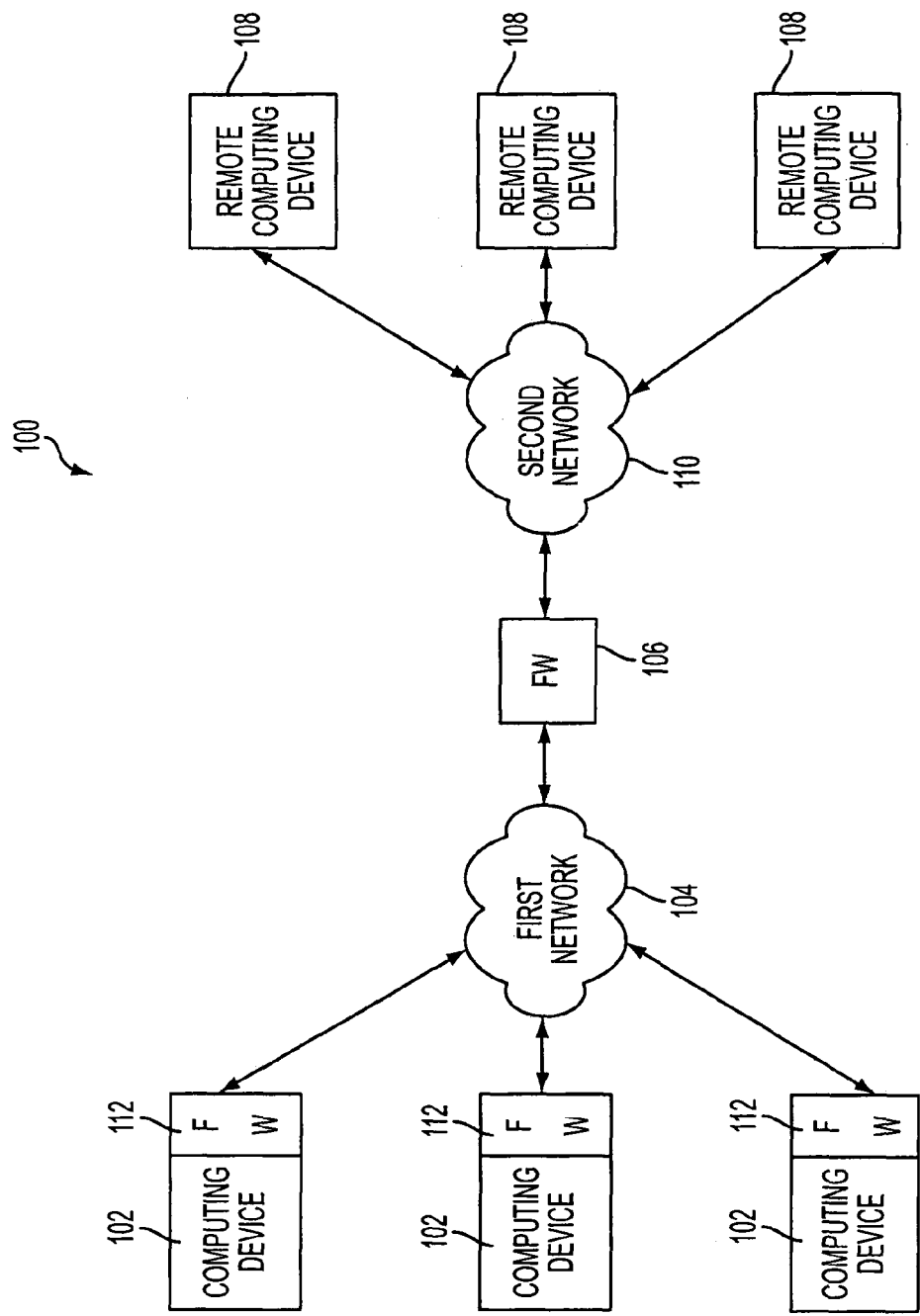
FIG. 1 shows a schematic depiction of an embodiment of a computing device network.

Prior to proceeding with a description of the various disclosed embodiments, a description of an exemplary computing device networking environment in which the disclosed embodiments may be implemented or practiced is provided in FIG. 1. It will be appreciated that the embodiments described in detail below may be implemented, for example, via computer-executable instructions or code, such as programs, stored on a computer-readable storage medium and executed by a computing device. Generally, programs include routines, objects, components, data structures, and the like that perform particular tasks or implement particular abstract data types. The term "program" as used herein may connote a single program or multiple programs acting in concert, and may be used to denote applications, services, or any other type or class of program. Likewise, the terms "computer" and "computing device" as used herein include any device that electronically executes one or more programs, including but not limited to personal computers, servers, laptop computers, hand-held devices, cellular phones, micro-processor-based programmable consumer electronics and/or appliances, routers, gateways, hubs and other computer networking devices.

FIG. 1 shows a schematic depiction of an exemplary computing device network environment 100. Network environment 100 includes several computing devices 102 connected to a first network 104 over which computing devices 102 may communicate with one another. First network 104 may include various components, such as routers, gateways, hubs, etc. to enable communication between computing devices 102. When communicating with one another over first network 104, one or more computing devices 102 may act as clients, servers, peers or combinations thereof with respect to other computing devices 102. Accordingly, it will be appreciated that the embodiments described herein may be practiced on clients, servers, peers or combinations thereof.

Computing devices 102 and other components of first network 104 are protected by a common firewall 106 from remote computing devices 108 located on a second network 110. One example of a second network 110 is a public network such as the Internet. Alternatively, second network 110 may be or include any other suitable network, such as a wide area network and/or a local area network.

Continuing with FIG. 1, each computing device 102 also may include a firewall 112 to control traffic between each computing device 102 and first network 104. Firewalls 112 on computing devices 102 may be referred to as "host firewalls" while firewall 106, positioned at the boundary between first network 104 and second network 110 may be referred to as an "edge firewall." It will be understood that the various embodiments described below may be implemented on any suitable device, including a host firewall or an edge firewall.

As described above, some applications and services may be configured to utilize dynamic port allocation to open firewall ports at runtime to avoid the potentially larger attack surface created by static port allocation. However, the opening or closing of a port is an operation that is generally performed only with administrative level (or policy level) rights' on some firewalls. Therefore, a program that dynamically opens or closes ports may utilize administrative rights to do so. This may result in the program overriding or modifying an administrative entity's firewall policy, possibly with little visibility to the administrative entity. As a result, many more firewall ports may be open at any given time than allowed under the administrative entity's firewall policy. This may result in the exposure of unwanted attack surface, the scope of which may be difficult for an administrative entity to assess. Furthermore, providing a program with administrative-level rights to open and close ports may pose a risk of malicious code taking over the program and disabling firewall security.

Figure 2A:
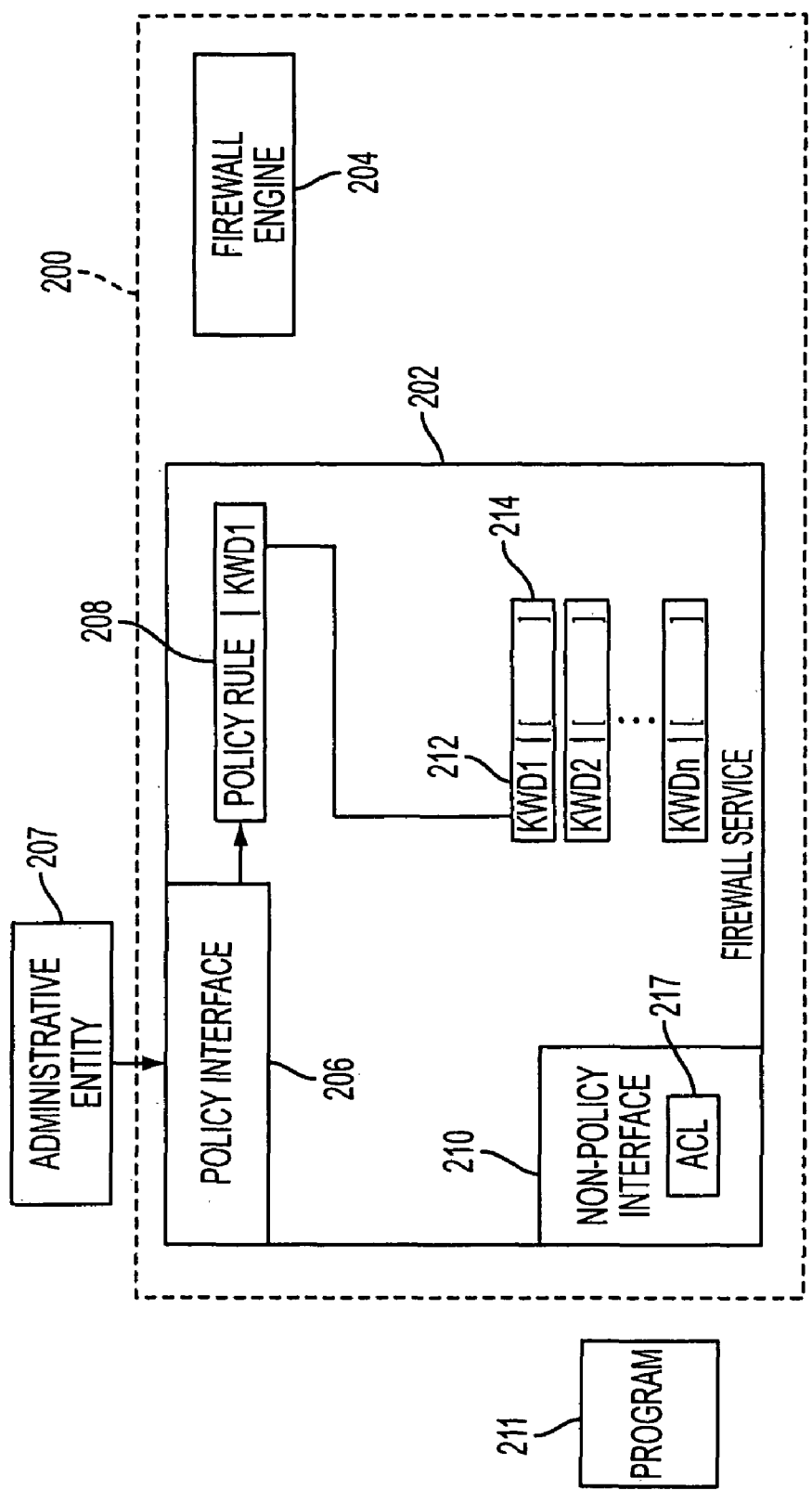
FIGS. 2A and 2B show a block diagram of an embodiment of a firewall, and illustrate a process flow utilized by the firewall.
Figure 2B:
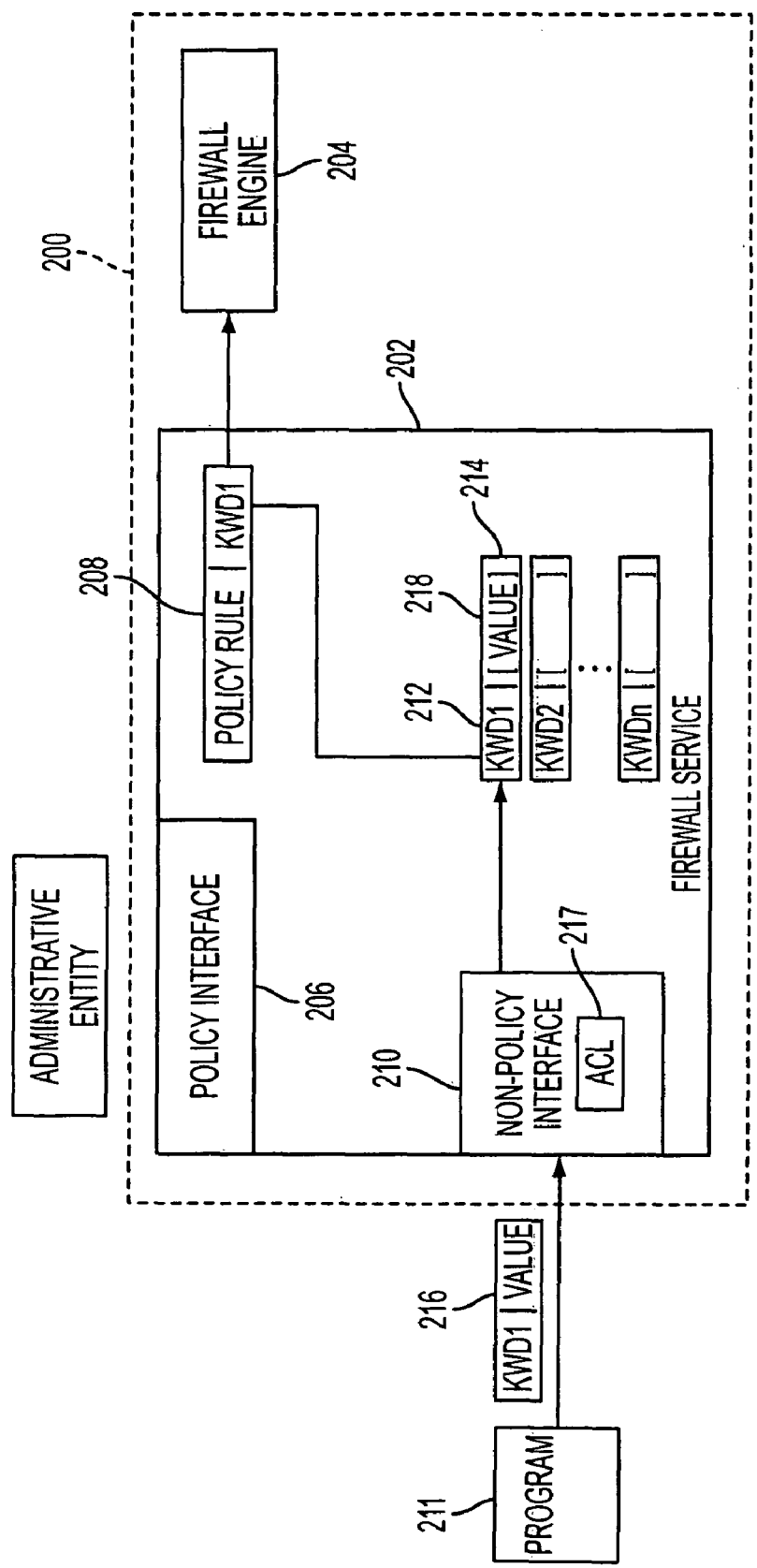

FIGS. 2A and 2B each shows a block diagram 200 of an embodiment of a firewall that may overcome such problems potentially found with dynamic port allocation. Firewall 200 includes a firewall service 202 and a firewall engine 204. Firewall service 202 may perform various tasks, including allowing rule creation and dynamic rule modification, while firewall engine 204 enforces policy rules. As such, firewall service 202 includes a policy level interface 206 at which an administrative entity 207, such as a system administrator, a management console, etc. may take policy-level actions regarding the firewall configuration, as shown in FIG. 2A. Such policy-level actions may include creating and implementing policy rules (illustrated schematically by rule 208), statically opening and closing ports, etc.

Firewall service 202 also includes a non-policy level interface 210 at which an entity such as an application or service, denoted generically as program 211, may contact firewall service with requests to dynamically update policy rules, as shown in FIG. 2B. Such requests may include requests to open or close ports, requests to update network resource addresses with which communication is allowed, or any other suitable firewall parameter modification. As described in more detail below, such requests are made at the non-policy level, and are granted only if the requested values fall within a range of one or more values preapproved by an administrative entity at rule creation. Program 211 may be any suitable program, including but not limited to a Teredo service, a remote procedure call (RPC) service, and/or a network location awareness (NLA) service.

Continuing with FIGS. 2A and 2B, firewall service 202 further may include from 1 to n keywords 212. Each keyword 212 is a unique identifier that is associated with a container 214, or collection of one or more data fields, that may be populated with one or more firewall parameter values by a program at runtime. Container 214 defines a range of permissible parameter values that may be used to populate the data fields within container 214. It will be understood that the term "range" as used herein may signify any suitable list or designation of allowed values. For example, a range of allowed values may be limited to only a single value, or may include more than one value. Furthermore, the values in the range may be sequential, non-sequential, or a mixture of both sequential and non-sequential values.

Referring specifically now to FIG. 2A, the keyword 212 may be referenced by, incorporated into, or otherwise made part of policy rule 208. Incorporation of keyword 212 into policy rule 208 results in the contents of container 214 being forwarded to firewall engine 204 for enforcement as part of rule 208. The association of keyword 212 incorporated into rule 208 and the contents of container 214 is indicated in FIGS. 2A and 2B by the line drawn between rule 208 and keyword 212.

Policy rule 208 is prepared by administrative entity 207, and received by the firewall service at policy level interface 206. In some embodiments, container 214 initially contains no firewall parameter values. Therefore, in these embodiments, when policy rule 208 is received, no exceptions to firewall policy are initially forwarded to firewall engine 204 for enforcement. Therefore, no additional attack surface is exposed by the creation of policy rule 208. In other embodiments, container 214 may contain one or more firewall parameter values as default values, or program 211 may populate container 214 with one or more firewall parameter values before the creation of policy rule 208. In these embodiments, the firewall parameter values in container 214 may be forwarded to firewall engine 204 for enforcement upon the receipt of policy rule 208.

Referring now specifically to FIG. 2B, program 211 may dynamically update a firewall parameter by sending a message 216 to non-policy level interface 210 that resolves the keyword to one or more specific firewall parameter values 218. Examples of specific firewall parameter values 218 may include, but are not limited to, specific port numbers and specific network resource addresses. Upon receipt of message 216 at non-policy level interface 210, firewall service 202 confirms that program 211 is authorized to update the firewall parameter at issue. This confirmation may be performed in any suitable manner. For example, firewall service 202 may include an access control list ("ACL") 217 that specifically authorizes which programs are allowed to populate container 214.

If firewall service 202 determines that program 211 is not authorized to populate container 212 with the requested firewall parameter value or the requested firewall parameter value is not within the allowed range of values, then the request is rejected. On the other hand, if it is determined that program 211 is authorized to populate container 214 with the requested firewall parameter value and that the value is within the allowed range of values, then the container is populated with the value (or, the keyword is "updated"), and the value is forwarded to firewall engine 204 for enforcement.

An example of a specific rule schema that contains a keyword "XYZKeyword" as a port definition for a service "XYZService" is as follows:

"Action=Allow|Active=TRUE|Dir=In|
Protocol=6|LPort=XYZKeyword|R
A4=LocalSubnet|RA6=LocalSubnet|
Svc=XYZService|App=%SystemRoot
%\system32\svchost.exe|Name=@wfapi.dll,-29001|EmbedCtxt=
@wfapi.dll,-29000|"

When service XYZService wishes to communicate with a remote device on the far side of the firewall, it can dynamically update the XYZKeyword at non-policy level interface 210 to resolve the keyword to a specific port number at which to receive traffic from the remote device. Container 214 is then populated with the specific port number, and the port number is forwarded to firewall engine 204 for enforcement.

Likewise, an example of a rule schema for XYZService that contains keywords "DHCP" and "WINS" for dynamically updated network address locations for DHCP and WINS servers is as follows:

"Action=Allow|Active=TRUE|Dir=In|
Protocol=6|LPort=XYZKeyword|R
A4=DHCP|RA6=DHCP|RA4=WINS|
RA6=WINS|Svc=XYZService|App=
%SystemRoot%\system32\svchost.exe|Name=@wfapi.dll,-
29002|EmbedCtxt=@wfapi.dll,-29000|"

When it is determined that a network resource address has changed, a dynamic update of the keywords DHCP and WINS may be received at non-policy level interface 210 to update the addresses in the containers associated with these keywords. Container 214 is then populated with the specific addresses, and firewall service 202 sends the updated addresses to firewall engine 204 for implementation in the appropriate rules.

Firewall service 202 may include any suitable number of keywords 212 and associated containers 214. For example, in some embodiments, each different program that utilizes dynamically updated firewall settings may have its own keyword and associated container. As discussed above, firewall service 202 includes n keywords, where n is any positive integer. In this manner, n different programs may each be configured to update an associated keyword. Likewise, each dynamically updateable network resource address may include its own keyword. In alternative embodiments, two or more programs or updateable network resource addresses may share a single keyword and container. Furthermore, each container may have different limitations than other containers, depending upon the functions of the program or programs authorized to populate the container. In this manner, an administrative entity or other policy-level entity (such as a firewall software or hardware developer) can control the limits of the abilities of programs to dynamically update firewall parameters.

Program 211 may utilize any suitable mechanism for contacting non-policy interface 210 with a keyword update. For example, program 211 may utilize a service implementing a protocol such as RPC or hypertext transfer protocol (HTTP) etc. Alternatively, program 211 may query a metabase or utilize a registry notification. It will be appreciated that access control list 217 may be used to verify that program 211 is authorized to update the requested keyword with any of these mechanisms before firewall service 202 performs the keyword update.

Keywords 212 and containers 214 may be implemented in firewall service 202 in any suitable manner. For example, in some embodiments, keywords 212, containers 214 and the limits defining permissible values for populating containers 214 may be hard-coded into firewall service 202. In other embodiments, firewall service 202 may provide for the ability of administrative entities to create new keywords and containers, and to define the permissible contents of associated containers. These embodiments may allow firewall 200 to be easily configured for new programs that employ the dynamic updating of firewall parameters.

Using the above-described features, firewall 200 may permit programs to dynamically update firewall parameters without using policy-level rights. Instead, a program requesting to populate container 214 with a firewall parameter value interfaces with firewall 200 at non-policy level interface 210. Furthermore, the values with which the program can populate the container are limited to those that an administrative-level entity has previously approved. Therefore, the risk of attack by malicious code on a program that has the ability to dynamically open and close ports is lessened. This is because the program cannot be used to open any ports other than those explicitly permitted by the keyword/container used by the rule.

Firewall 200 also provides a two-level security system for dynamically requested firewall parameter value updates. First, an administrative entity defines the identity and scope of those firewall parameters that a specific program is allowed to update dynamically. This process generally occurs prior to program runtime, but may occur at any other suitable time. Next, when a program requests to dynamically update a firewall parameter value, firewall service 202 verifies that the program is permitted to perform the dynamic update and that the requested value is within the permissible range of values before forwarding the value to firewall engine 204 for enforcement. This process generally occurs at program runtime, but may occur at any other suitable time. In this manner, firewall 200 acts as two locks opened by two keys at potentially two separate times—one operated by the administrative entity at a policy level interface at rule creation, and one operated by a program at a non-policy level interface at runtime.

Further, firewall 200 may offer improved visibility over which ports are open at any given time. First, because a firewall parameter cannot be dynamically changed to a value outside of those values that are authorized to populate containers 214, an administrative entity can ensure that the maximum attack surface is no greater than that allowed by containers 214. Furthermore, an administrative user interface may be configured to display the contents of containers 214. Therefore, an administrative entity can verify the status of the ports (e.g., which ports are opened or closed, etc.) at any desired time. Additionally, firewall 200 may offer an improved administrative user experience, as fewer total exceptions are generally managed during runtime.

In addition to simplifying the dynamic opening of ports, firewall 200 also offers a simple mechanism for dynamically closing ports once a program no longer needs to receive data at a port. Upon conclusion of data receipt, the program can send another message to non-policy level interface 210 that resolves the keyword to a value that signifies a port closure. Upon receipt of this request and verification that the program has the right to update the keyword, firewall service 202 may populate the container with the value signifying port closure. The firewall service will then remove the filters from the firewall engine that are associated with the port that was removed from the container, thereby closing the port. In this manner, the attack surface at runtime may be reduced, as only a minimum number of ports needed for communication are open at any time.

Figure 3:
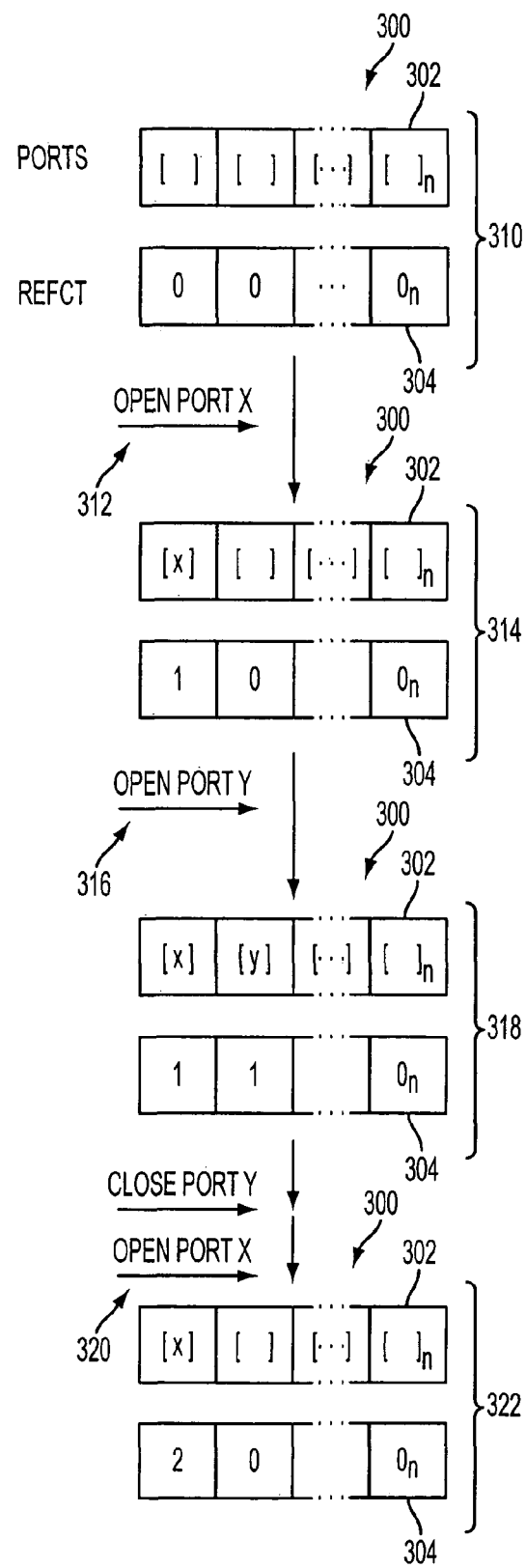
FIG. 3 shows a schematic depiction of an embodiment of a data structure for containing dynamically updated firewall parameter values, and illustrates an updating of the contents of the data structure.

Continuing with the figures, FIG. 3 shows a schematic depiction of an exemplary embodiment of a data structure 300 for container 214. Data structure 300 includes a first array 302 having n fields for containing port numbers requested to be opened by an authorized program. Data structure 300 also includes a second array 304 also having n fields for maintaining a count of port openings and closings requested for each port number in array 302. While the depicted container 214 includes first and second arrays 302 and 304, it will be understood that a container may have any suitable data structure, and may be configured to contain any suitable data.

FIG. 3 also shows an example of how the values stored in first array 302 and second array 304 may be updated over time. Initially, as depicted at 310, first array 302 is empty. This state exists when no program has requested a port to be opened. Next, a request 312 is received from an authorized program to open port X, for example, to receive a return from a remote process, to receive a data stream at the requested port, etc. Referring next to 314, upon receipt of request 312 and verification that the program has the authority to open port X, array 302 is populated with the port number for port X. This is represented in FIG. 3 by the symbol X, but it will be understood that port addresses are generally expressed in numerical format. Likewise, the field in array 304 corresponding to the number of times the opening of port X is requested is increased by a value of one, such that a total count of one is stored in array 304.

FIG. 3 next shows the receipt of a request 316 to open port Y. Upon receipt of request 316 and verification that the requesting program has the authority to open port Y, array 302 is updated to include a value signifying that port Y is currently open. Likewise, the field in array 304 that represents the number of times the opening of port Y has been requested is increased by one. At this time, as indicated at 318, array 302 includes entries indicating that ports X and Y are currently open, and array 304 includes entries showing that the opening of each port has been requested once.

Next, FIG. 3 shows the receipt of requests 320 to close port Y and open port X. Upon receipt of requests 320 and verification that the requesting program has the authority to perform the requested actions, the count in array 304 of the number of openings requested is increased by one for port X and decreased by one for port Y. Further, because this decreased the count of the openings of port Y to zero, the entry in array 302 for port Y is removed from array 302, signifying that port Y is no longer open. Likewise the entry for port X in array 302 is increased to 2. Thus, two requests to close port X will be received before port X is closed, unless an administrative entity closes the port manually.

Figure 4:
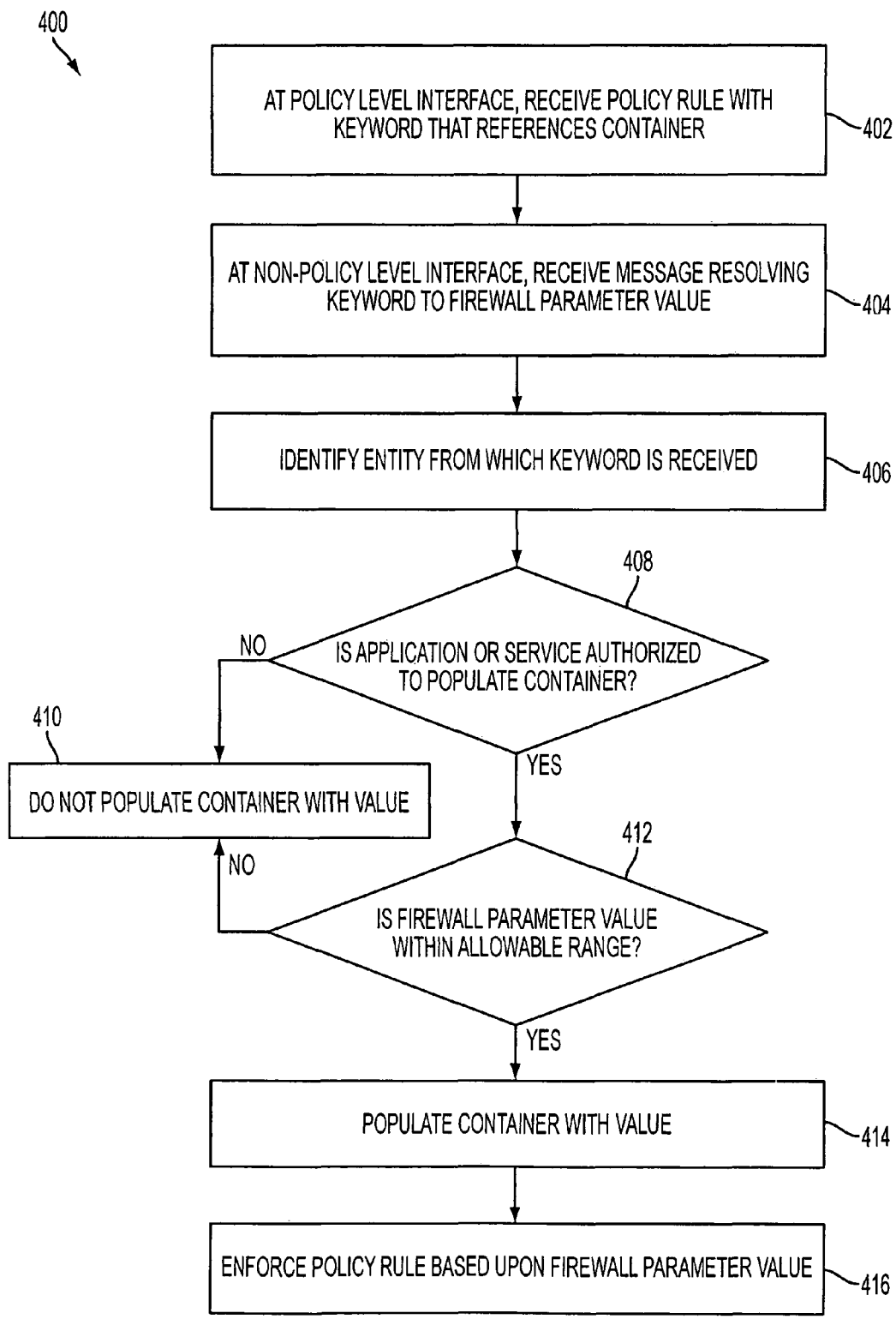
FIG. 4 shows an exemplary embodiment of a process flow of a method for dynamically updating a firewall parameter.

Various methods may be used to implement the various features of the embodiments described above. FIG. 4 shows a flow diagram of one exemplary embodiment of a method 400 of dynamically updating a security rule in firewall 200. Method 400 includes, at 402, receiving from an administrative entity a policy rule containing a keyword that references a predefined container. As described above in the context of FIGS. 2 and 3, the keyword and container define a range of firewall parameter values that can be used to populate the container, and also may define those applications that are authorized to populate the container. The range of values may be limited to a single value, or may include more than one value.

The keyword and container may be defined at any suitable time prior to receiving the policy rule from the administrative entity. In some embodiments, the keyword and container may be hard coded into a firewall service program, and therefore defined during software/hardware development. In other embodiments, the keyword and container may be created by an administrative entity at a later time, but prior to creation of the policy rule. In yet other embodiments, the keyword and container may be defined during the creation of a policy rule utilizing the keyword and container. It will be appreciated that in any of these embodiments, the keyword and container are defined prior to the receipt of the policy rule at the policy level interface, and therefore that the keyword and container may be considered to be predefined relative to the receipt of the policy rule.

Continuing with FIG. 4, method 400 next includes, at 404, receiving at a non-policy level interface a message resolving the keyword to a firewall parameter value. The non-policy level interface may include an application programming interface (API) configured to receive messages from other programs (such as applications or services), and/or may include a user interface program configured to allow an authorized user of a lower (or arbitrary) privilege level to populate the container with a firewall parameter value. The message received at the non-policy level interface may be received at program runtime, or at any other suitable time. Examples of other suitable times may include during program setup or installation, or after program setup but before runtime. Additionally, the message received at the non-policy level interface may be received either before or after the policy rule is received at the policy interface.

Further, the message received at 404 may resolve the keyword to any suitable firewall parameter. For example, the keyword may be resolved to a port number requesting that the port be opened or closed, or may be resolved to an empty set, thereby requesting that the contents of the container be cleared. Furthermore, in some embodiments, the keyword may be resolved to a network address, as described below in more detail with reference to FIG. 5.

Continuing with FIG. 4, upon receipt of the message resolving the keyword to a firewall parameter value, method 400 next includes determining whether to populate the container with the firewall parameter value. This process includes determining, at 406, the identify of a program, user or other entity that sent the message resolving the keyword to a firewall parameter value, and then confirming, at 408, whether the program that sent the message resolving the keyword to the firewall parameter value is authorized to update the keyword. This process may include comparing the identification of the entity to an ACL defining which entities are permitted to update a specific keyword.

If it is determined that the program is not authorized to update the keyword, then the container is not populated with the value, as shown at 410. On the other hand, if the program is authorized to update the keyword, then it is determined at 412 whether the firewall parameter value is within the range of firewall parameter values allowed for populating the container. If it is determined that the firewall parameter value is not within the permissible firewall parameter value range, then the container is not populated with the firewall parameter value, as shown at 410. On the other hand, if it is determined that the firewall parameter value is within the permissible range, then the container is populated with the firewall parameter value, as shown at 414. Finally, the updated policy rule is enforced at 416.

Method 400 allows a policy rule to be dynamically updated by an entity with non-administrative (or arbitrary) rights without changing any rules or violating policies created and implemented by an administrative entity. Furthermore, an administrative user interface may be configured to display the current contents of each container, as well as information such as an identity of the program or programs that populated the containers. This may provide an administrative entity with a high degree of visibility of the filters in use by the firewall at any time.

As mentioned above, various firewall parameters other than port numbers may be updated dynamically in a similar manner. For example, addresses of various network resources may change over time. Examples of such network resources include domain name servers, DHCP (dynamic host configuration protocol) servers, default gateways, local subnet, WINS (WINDOWS internet naming service) servers, etc.

In many firewalls, static rules are used to implement such addresses in filters. As a result, if a network resource address changes, a rule utilizing the prior address as a filter may be invalid until an administrative entity modifies the rule to include the new address. To overcome such problems, a keyword may be defined for a network resource address updating program, and an associated container may be configured to contain one or more network resource addresses. This allows an administrative entity to create a policy rule that contains the keyword and thereby implements the firewall parameter values populating the container.

Figure 5:
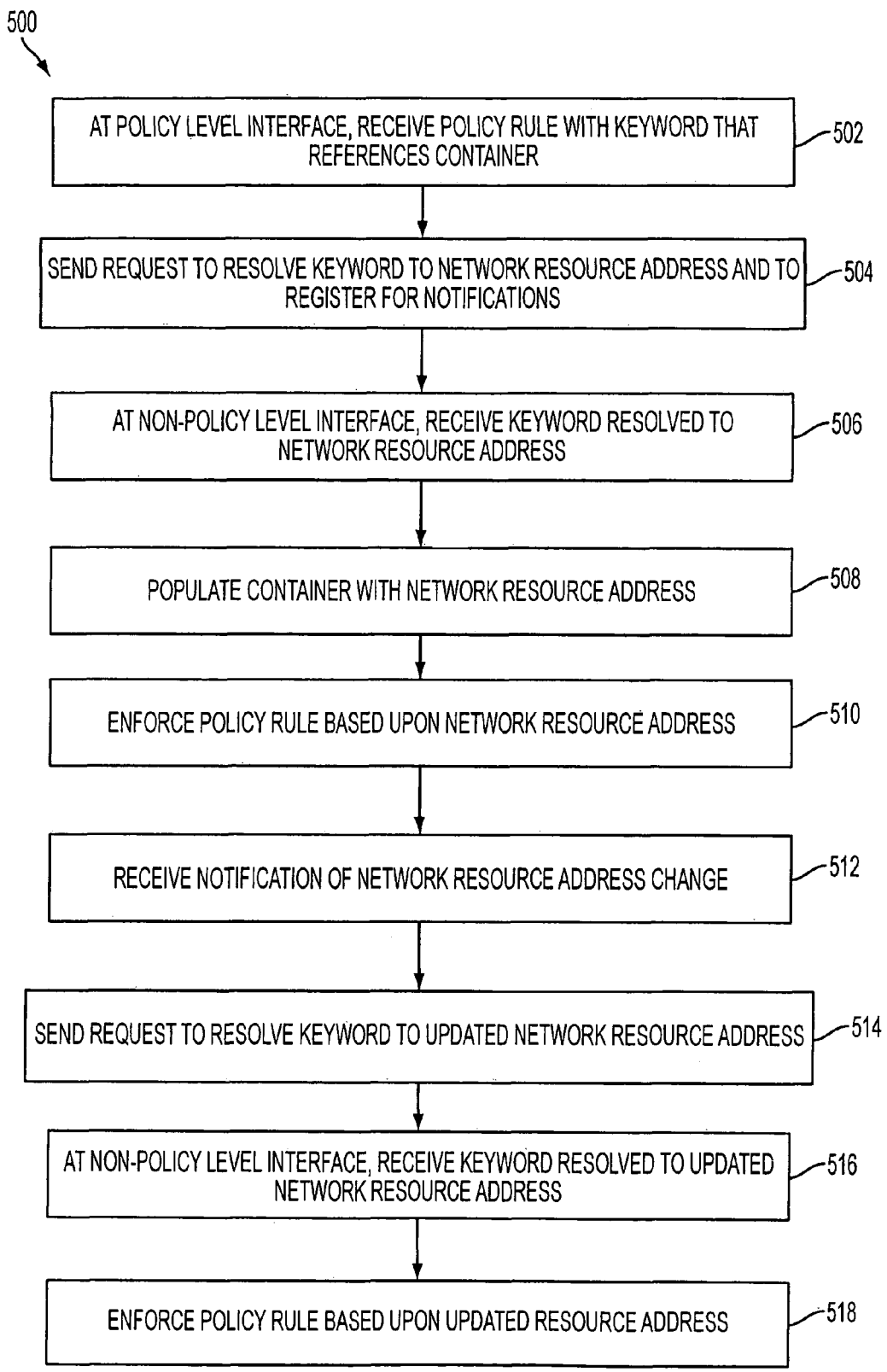
FIG. 5 shows another embodiment of a process flow of a method for dynamically updating a firewall parameter.

In this manner, a network resource address updating program may be configured to update the network address by sending a message resolving the keyword to an updated network address. FIG. 5 shows an exemplary embodiment of a method 500 for dynamically updating a network address. Method 500 first includes, at 502, receiving a policy rule with a keyword that references a predefined container configured to be populated with one or more network resource addresses. The policy rule may be received from an administrative user, an administrative-level management console, or any other suitable administrative entity.

Next, method 500 includes sending, at 504, a request to resolve the keyword to one or more network resource addresses. This may be performed at firewall service startup, or at any other suitable time. Likewise, this request may be sent to a NLA service, or to any other suitable service that can return an address of a network resource. Furthermore, this request may also include a request to register with the NLA service for notifications of changes in the address of one or more network resources.

After sending the request to resolve the keyword to the network resource address, a message resolving the keyword to the network resource address is received from the NLA service at a non-policy level interface at 506. Then, the container is populated with the network resource address at 508, and the policy rule with the firewall parameter value in the container is enforced at 510.

In some embodiments, before populating the container with the network resource address, the identification of the service sending the message may be confirmed to ensure that the message is received from an authorized program. In alternative embodiments, because this message is received in response to a specific request, such a confirmation may be omitted.

Continuing with FIG. 5, when the NLA service detects a change in a network resource address, a notification of the address change is sent by the NLA service and received at 512 at the non-policy level interface. Upon receipt of the notification, a request is sent at 514 to the NLA service to again resolve the keyword to one or more network resource addresses that populate the container. The request may request only the changed network address to be resolved to the keyword, or may request that the keyword be resolved to all network resource addresses stored in the container where the container is populated by more than one network address.

Next, at 516, a message resolving the keyword to the updated network resource address is received at the non-policy level interface. The updated network resource address is then used to populate the container, and the policy rule, with an exception defined by the updated network resource address stored in the container, is enforced at 518. In this manner, network resource addresses may be updated dynamically with no input from an administrative entity after rule creation. Furthermore, the updating of a network resource address via method 500 may expose no additional attack surface to malicious code, as the update may be performed without the utilization of administrative rights, and without changing firewall policy.

The dynamic updating of network resource address rules according to method 500 may allow an administrative entity that authors a rule to specify a restrictive intent for common resources without having to manually look up the resource address when creating the rule. Likewise, application developers may create firewall rules for common resources without knowing the resource addresses; Additionally, method 500 provides for the authoring of rules when the addresses of resources may change dynamically without having to specify looser restrictions and thereby exposing additional attack surface.

Figure 6:
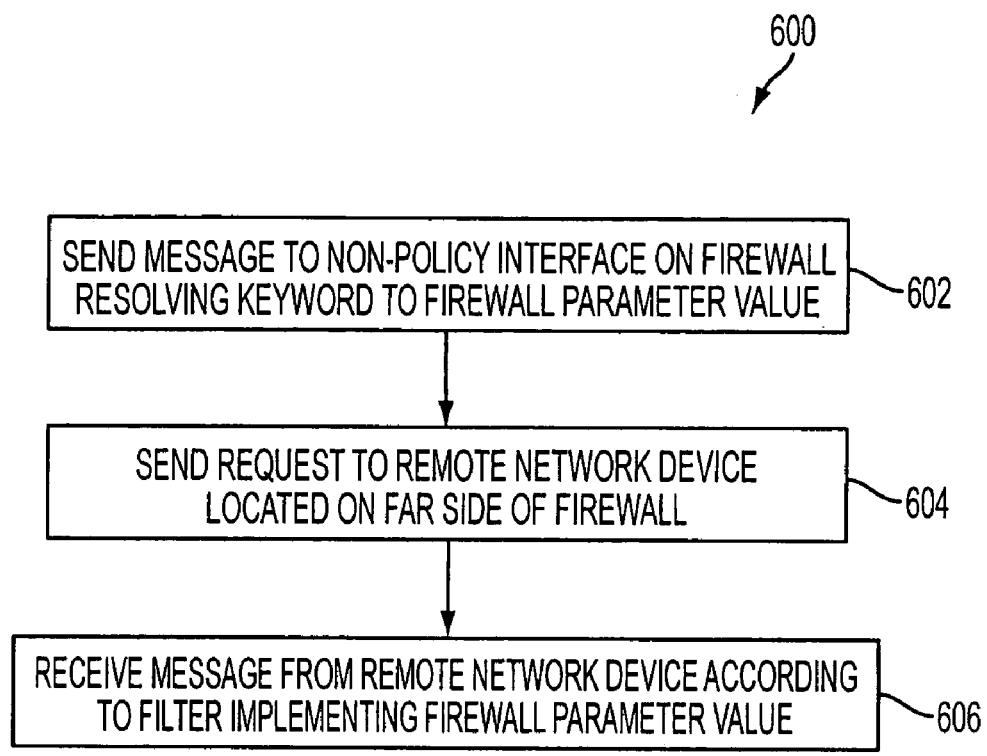
FIG. 6 shows a further embodiment of a process flow of a method for dynamically updating a firewall parameter.

FIG. 6 shows a flow diagram of a general method 600 for one or more programs to communicate with a firewall to dynamically update a parameter on the firewall. Initially, the firewall includes a predefined keyword and associated container that is either empty or populated with a previously requested firewall parameter value. Method 600 is initiated when the program wishes to update a firewall policy rule that incorporates the keyword. For example, the program may wish to send data to or receive a return, a data stream, etc., from a remote device located across the firewall (e.g. on the far side of the firewall), and may need to open a dynamic port through which to conduct such communication. Likewise, the program may have received a request from the firewall to update a network resource address associated with a keyword, and wishes to send the updated network address. In either case, the program sends, at 602, a message to a non-policy level interface on the firewall resolving the keyword to a desired firewall parameter value.

As long as the program that sent the message at 602 to the firewall is authorized to update the requested keyword with the requested firewall parameter value, the value is implemented as an updated rule by the firewall, and the program (or another program on the same computing device) may then communicate with a remote device on the far side of the firewall according to the updated policy rule. Such communication may involve sending, at 604, a request to the remote network device for a return of data at a port specified by the updated policy rule. As another example, such a request may involve sending a request to a domain name server at an updated address, or sending other such messages to network resources at updated addresses. The requested return from the remote network device may then be received, at 606, by the requesting program due to the exception created by the implementation of the firewall parameter value in the updated policy rule. In this manner, the program is able to dynamically configure the firewall to meet the current communication needs of the program without modifying firewall policy and without invoking administrative rights to perform the dynamic configuration.

It will be appreciated that the configurations and/or approaches described herein are exemplary in nature, and that these specific embodiments or examples are not to be considered in a limiting sense, because numerous variations are possible. For example, while the above embodiments are described in the context of dynamically updating port definitions and network resource addresses, it will be appreciated that the concepts may be applied in a similar manner to any other suitable firewall filtering parameter. Furthermore, the specific routines or methods described herein may represent one or more of any number of processing strategies such as event-driven, interrupt-driven, multi-tasking, multi-threading, and the like. As such, various acts illustrated may be performed in the sequence illustrated, in parallel, or in some cases omitted. Likewise, the order of any of the above-described processes is not necessarily required to achieve the features and/or results of the exemplary embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device configured to execute a firewall for implementing security policy for controlling network traffic, the computing device comprising:

an electronic processor; and code executable by the electronic processor to:

receive a policy rule at a policy level interface, the policy rule comprising a keyword reference to a predefined container that specifies a permissible value range of at least one firewall parameter allowable under the policy rule, the keyword reference being an identifier associated with the predefined container;

receive at a non-policy level interface a request from a program protected by the firewall to populate the predefined container referenced by the keyword with a firewall parameter value;

identify the program from which the request is received and determine whether the program is authorized to populate the predefined container referenced by the keyword; and populate the predefined container with the firewall parameter value if the firewall parameter value is within the permissible value range and if the program is authorized to populate the firewall parameter.

2. The computing device of claim 1, wherein the program comprises one or more of a remote procedure call service, a Teredo service, and a network location awareness service.

3. The computing device of claim 1, wherein the predefined container initially contains no firewall parameter values.

4. The computing device of claim 1, wherein the permissible value range comprises one or more permissible values.

5. The computing device of claim 1, wherein the firewall parameter value comprises one or more of a port number and an address.

6. The computing device of claim 1, wherein the policy rule is received at a first, earlier time, and the request is received at a second, later time.

7. A computing device configured to execute a firewall for implementing security policy for controlling network traffic, the computing device comprising:

an electronic processor; and code executable by the electronic processor to:

present a policy level interface at which the firewall can receive an input of a policy rule including a keyword referencing a predefined container that specifies a permissible value range of port numbers to open allowable under the policy rule, the keyword being an identifier associated with the predefined container;

present a non-policy level interface at which the firewall can receive the keyword and a request from a program protected by the firewall to open a port number;

populate the predefined container referenced by the keyword with the port number if the port number is within the permissible value range and the program is authorized to populate the predefined container; and enforce the policy rule.

8. The computing device of claim 7, further comprising code representing an access control list to determine whether the program from which the request to open the port number is received is authorized to populate the predefined container.

9. The computing device of claim 7, further comprising code representing the predefined container.

10. The computing device of claim 7, further comprising code executable to determine whether the port number to open received from the program is within the permissible value range.

11. A method for dynamically updating a firewall parameter of a firewall located between a first program and a network, the first program protected by the firewall, the method comprising:

presenting a policy level interface to a second program having administrative rights;

receiving a policy rule from the second program at the policy level interface, the policy rule comprising a keyword reference to a predefined container that specifies a permissible value range of at least one firewall parameter allowable under the policy rule, the keyword reference being an identifier associated with the predefined container;

presenting a non-policy level interface to the first program, the first program not having administrative rights;

receiving a request from the first program at the non-policy level interface to populate the predefined container referenced by the keyword with a firewall parameter value;

identifying the first program;

determining whether the first program is authorized to populate the predefined container referenced by the keyword;

populating the predefined container with the firewall parameter value if the firewall parameter value is within the permissible value range and if the first program is authorized to populate the firewall parameter; and opening a port to communicate with a remote device connected to the network on a far side of the firewall, the port opened according to the firewall parameter value.

12. The method of claim 11, wherein determining whether the first program is authorized to populate the predefined container referenced by the keyword includes comparing the identification of the first program to an access control list.

13. The method of claim 11, wherein the first program comprises one or more of a remote procedure call service, a Teredo service, and a network location awareness service.

14. The method of claim 11, wherein the firewall parameter value comprises one or more of a port number and an address.

* * * * *